INVENTOR.
Hans Dalla Bona

United States Patent Office 3,372,483
Patented Mar. 12, 1968

3,372,483
DENTAL PROSTHESIS
Hans Dalla Bona, 419 Hohenweg,
2563 Ipsach, Switzerland
Filed Mar. 12, 1965, Ser. No. 439,231
Claims priority, application Switzerland, Apr. 22, 1964,
5,243/64
5 Claims. (Cl. 32—5)

ABSTRACT OF THE DISCLOSURE

A dental prothesis having a first joint portion comprising a sleeve and pressure spring assembled with a second joint portion comprising a ball, held in the sleeve by a removable pin, and having a shank attached to a natural tooth, such joint portions being adapted for limited relative translatory and angular displacement.

---

This invention relates to a dental joint for pivotably assembling a partial dental prothesis with an anchoring member, for instance a clamp, attached to the residual natural teeth. A pivotable joint connection between the clamp or similar anchoring member and the partial dental prothesis is required because during the mastication the clamp should not be displaced on the residual natural teeth while the partial prothesis slightly sinks into the resilient support formed by the mucosa.

Simple pivot joints have been used for coupling dental prothesis with the residual teeth, but such joints are undesirable from a physiological point of view for obtaining optimal biomechanical functions. When the prothesis is loaded by the mastication pressure, this pressure is substantially transmitted from one end of the prothesis through the joint to the anchoring member attached to the residual teeth and from the end of the base of the prothesis to the suporting mucosa. This results in a compression atrophy of the jaw and in excessive load on the anchoring means which are thus displaced on the anchoring tooth or teeth, the latter being thereby damaged.

In order to avoid the above drawbacks it is necessary to provide for a primary sinking motion of the whole prothesis and additionally for an angular displacement of the prothesis. In accordance with this invention this is achieved by providing joint portions adapted for relative translatory displacement in one direction against spring action and for relative angular displacement in a plane comprising the said one direction, and stop means maintaining said joint portions in engaged position and defining the relative rest position of the joint portions.

Figure 1:
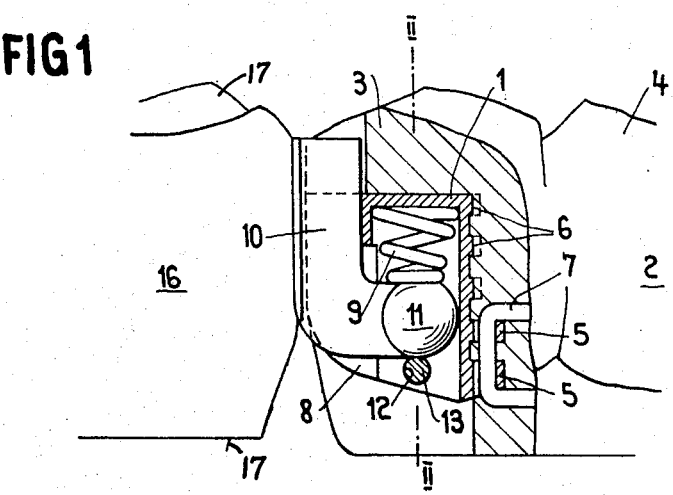
Figure 2:
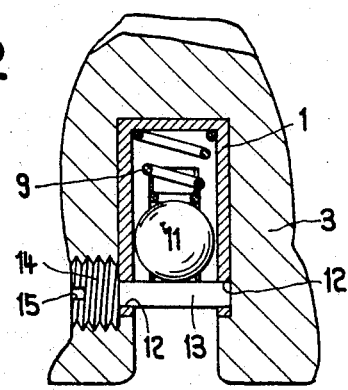
Figure 3:
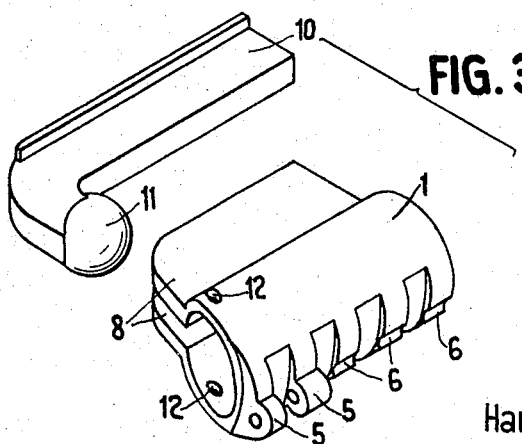

This invention will now be further explained with reference to the attached drawing showing, by way of example, an embodiment of the invention and wherein FIG. 1 is a sectional view of the dental joint in assembled and mounted state, FIG. 2 is a section along line II—II in FIG. 1 and FIG. 3 is a perspective view of the separated joint portions.

The joint has a first sleeve-shaped joint portion 1 adapted to be embedded into the one end of the base 2 of a partial prothesis having teeth 3 and 4 as schematically shown in FIG. 1. The one side of the sleeve portion 1 has anchoring lugs 5 with apertures and shorter anchoring lugs 6 whereby the anchorage of the sleeve portion 1 of the joint in the base material of the prothesis is substantially improved. For further improving the anchorage of the sleeve portion 1, a wire loop 7 may be mounted in the apertures of lugs 5 and embedded in the base material. At its side opposite the lugs 5 and 6 the sleeve portion 1 has a slit enclosed by guiding jaws 8. A slightly conical spring 9 is inserted into the sleeve portion with its widest winding engaging the bottom of the sleeve and elastically engaging the side walls of the sleeve bore so that the spring is held in its position shown in FIGS. 1 and 2.

The other joint portion comprises a T-shaped rail of which the web 10 may be engaged between the jaws 8 of portion 1 with little clearance. At its lower end the rail is bent and connected to a joint ball 11.

The lower end of the sleeve 1 has two coaxial bores 12 for insertion of a stop pin 13. The one end of stop pin 13 has a screw-threaded portion 14 of a diameter exceeding the diameter of the pin. The screw-threaded end of the stop pin has a slit or groove 15. With the sleeve 1 embedded in the base of the prothesis as shown in FIG. 2 the screw-threaded portion 14 of the stop pin is embedded in the base material with its outer end and slit 15 accessible. It is thus possible to remove the stop pin from the sleeve 1 and base material respectively for allowing disassembling of the joint portions.

The plane outer surface of the joint portion 10, 11 is soldered to the one end of a tooth clamp system 16 anchored on natural teeth of which one is shown at 17 in FIG. 1.

FIG. 1 shows the joint and prothesis 3 in unloaded condition in which case the prothesis base is maintained in horizontal position by the joint. This rest position of the joint and prothesis respectively is determined by engagement of the stop pin 13 on the bottom side of the joint ball 11 whereby the prothesis is supported by the spring 9. Tilting of the prothesis by its own weight is prevented by the frictional engagement of the stop pin 13 on the bottom surface of the joint ball 11, because such a tilting motion is only possible when the friction between portions 11 and 13 is overcome. When the prothesis is loaded the spring 9 is first compressed so that a translatory displacement of the sleeve 1 and prothesis respectively relatively to the joint ball 11 occurs. Thereby the stop pin 13 is disengaged from the joint ball 11 thereby allowing free angular displacement of the sleeve 1 and prothesis 2 relatively to the joint ball. The base of the prothesis 2 is thus uniformly pressed against its support so that a physiologically favourable loading of the latter is obtained. Relatively small forces only are transmitted through the joint to the tooth clamp 16.

For disassembling the joint portions the stop pin may be removed and reinserted after assembling the joint portions.

What I claim is:

1. A dental prothesis having a base and including a joint having two portions, one joint portion comprising a ball with a shank adapted to be attached to a natural tooth and the other joint portion comprising a sleeve having a bottom at one end and open at the other end and embedded in the base of the prothesis, said sleeve having an axial slit receiving and guiding said shank with said ball engaging in the bore of the sleeve, a pressure spring disposed betwen the bottom of said sleeve and the ball, a pin removably secured across the open end of the sleeve and forming a stop for said ball when urged against the stop pin by said pressure spring in unloaded condition of the prothesis thereby defining the position of the unloaded prothesis.

2. A dental prothesis according to claim 1, wherein said stop pin has a screw-threaded portion of a diameter exceeding the diameter of the stop portion, said screw-threaded portion being removably anchored in the base of the prothesis.

3. A dental prothesis according to claim 1, wherein said sleeve has radial lugs with apertures, auxiliary anchoring means embedded in the base of the prothesis being mounted in said apertures.

4. A dental prothesis according to claim 3, wherein a wire loop is inserted into said apertures and embedded in the base of the prothesis.

5. A dental prothesis having a base, a joint comprising a sleeve embedded in said base and having a bottom at one end and an opening at the other end, an axial slit in said sleeve and guiding jaws radially extending outwardly from said slit, a ball in said sleeve and a flat shank portion adapted to be attached to a natural tooth and extending from said ball and guided in a plane comprising the sleeve axis in said slit and between said jaws respectively, said ball and shank being adapted for translatory displacement in the direction of the sleeve axis and for angular displacement in said plane relatively to said sleeve, a stop pin crossing the open end of the sleeve and forming a stop for said ball, a pressure spring disposed between said bottom of the sleeve and said ball, said ball being urged against said stop pin by said spring thereby defining the position of said base of the prothesis in its unloaded state.

References Cited
FOREIGN PATENTS

| | | |
|---|---|---|
| 1,042,503 | 6/1953 | France. |
| 605,710 | 6/1960 | Italy. |
| 1,097,618 | 1/1961 | Germany. |

LOUIS G. MANCENE, *Primary Examiner.*

ROBERT E. MORGAN, *Examiner.*